United States Patent [19]

Imbert

[11] 4,453,902
[45] Jun. 12, 1984

[54] TIRE CURING PRESS

[75] Inventor: Jean-Maurice Imbert, Akron, Ohio

[73] Assignee: McNeil-Akron, Inc., Akron, Ohio

[21] Appl. No.: 520,498

[22] Filed: Aug. 4, 1983

[51] Int. Cl.[3] .............................................. B29H 5/02
[52] U.S. Cl. ................................. 425/47; 425/28 R; 425/43
[58] Field of Search ............... 425/28 R, 43, 47, 450.1, 425/451.2, 451.9, 453, 454, 589, 590, 595, DIG. 220, DIG. 221, DIG. 222, DIG. 223, 78, 149, 25, 33

[56] References Cited

U.S. PATENT DOCUMENTS

| | | | |
|---|---|---|---|
| 1,895,296 | 1/1933 | Shook et al. | 425/47 |
| 2,198,493 | 4/1940 | Freeman | 425/47 X |
| 2,358,765 | 9/1944 | Stadlin | 425/149 X |
| 3,168,759 | 2/1965 | Johannigman | 425/78 |
| 3,191,235 | 6/1965 | Rougement | 425/451.2 X |
| 3,270,372 | 9/1966 | Hesse | 425/451.2 |
| 3,346,924 | 10/1967 | Lombard | 425/595 X |
| 3,465,387 | 9/1969 | Allard et al. | 425/590 X |
| 3,528,134 | 9/1970 | Fischbach | 425/595 X |
| 3,540,081 | 11/1970 | Carrieri et al. | 425/595 X |
| 3,656,877 | 4/1972 | Aoki | 425/590 X |
| 3,669,593 | 6/1972 | Cyriax | 425/589 X |
| 3,847,529 | 11/1974 | Farrell et al. | 425/451.2 |
| 4,130,384 | 12/1978 | MacMillan | 425/25 |
| 4,212,605 | 7/1980 | MacMillan | 425/47 X |
| 4,245,971 | 1/1981 | MacMillan | 425/47 |
| 4,304,540 | 12/1981 | Hammon | 425/590 X |
| 4,315,727 | 2/1982 | Black | 425/595 |
| 4,318,682 | 3/1982 | Larson et al. | 425/595 X |
| 4,332,536 | 1/1982 | Singh et al. | 425/33 |
| 4,364,720 | 12/1982 | Ryder | 425/595 X |
| 4,383,808 | 5/1983 | Kubo et al. | 425/47 |

FOREIGN PATENT DOCUMENTS 1275067   9/1961   France ........................ 425/590

Primary Examiner—J. Howard Flint, Jr.
Attorney, Agent, or Firm—Renner, Kenner, Greive & Bobak

[57] ABSTRACT

A tire curing press (20) according to the concepts of the present invention includes a fixed base (12), a base beam (20) mounted on the fixed base, a lower mold section (L) for a tire supported by the base beam, a cross beam (25) supportingly mounting an upper mold (U), a beam lifting device (40) for effecting relative movement between the base beam and the cross beam, a connecting rod assembly (30) for aligning the upper mold section and the lower mold section, bolster assemblies (68, 80) positioned between the beams and the mold sections, and loading elements (75, 85) interposed between the beams and the bolsters for applying mold section squeeze forces at selected locations on the bolsters producing substantially uniform loading on the mold sections. The tire curing press may have in lieu of or in addition to the loading elements strain rod locking assemblies (100) selectively locking the strain rod (31) of each connecting rod assembly during the application of squeeze forces to the mold sections.

42 Claims, 9 Drawing Figures

TIRE CURING PRESS

TECHNICAL FIELD

The present invention relates generally to presses for the shaping and curing of pneumatic tires. More particularly, the present invention relates to a new configuration particularly adapted to a single cavity tire curing press. More specifically, the present invention relates to a single cavity tire curing press which is capable of meeting stringent industry requirements for press performance while nevertheless achieving savings in press size, weight, complexity, and cost.

BACKGROUND ART

It has long been the practice in the tire curing art to counter the extreme forces created by the introduction of high pressure fluids interiorly of a tire positioned within mold sections by use of heavy mechanical components in the design of tire curing presses. The most successful and commonly employed mechanical designs have included base and cross beam elements of heavy steel with reinforcing design to minimize the deflection produced by the forces and moments developed during press loading. The closing of the mold sections effected by movement of the cross beam and the application of sufficient squeeze or closing force to maintain the mold sections closed during the curing operation have been produced by toggle mechanisms consisting of bull gears trunnion mounting side links which are attached to the cross beam by second trunnions. Further, large side plates have been employed to control the movement of the second trunnions in selected cam slots therein to dictate the path and orientation of the cross beam involved in travel of the press cross beam from the closed to the open position.

Besides the size and complexity of conventional mechanical drive mechanisms for tire curing presses, the interrelation of the conventional components has resulted in presses of very large size and weight, particularly as the size and pressures involved in curing presses for larger tires are accommodated. Such size, weight and complexity have also translated into very high manufacturing, transportation and installation costs. It has also been recognized that the size, complexity and interrelation of conventional press elements have been such that the introduction or addition of insulating materials to reduce operating costs is not readily accomplished, whereby substantial energy inefficiencies have long been tolerated in regard to tire curing presses.

While it has been recognized for some time that a hydraulically actuated press could provide substantial advantages as contrasted with conventional mechanical operation, in the context of a simple vertically opening press, a number of serious deterrents have been encountered in efforts to develop successful hydraulically actuated tire curing presses. Due to the complexities involved some hydraulic presses have not employed positive locking devices which preclude opening during the press curing cycle to counteract the pressures within a tire being cured. In other instances, interlocking elements associated with the upper and lower mold sections or elements associated therewith have been employed to effect a requisite locking engagement precluding press opening in the event of hydraulic pressure failure. Whether or not provided with high pressure preloaded interlocking engagement, bayonet type lock mechanisms have been proven to be relatively complex and expensive and to require additional press components in the nature of mold height adjustment apparatus for the differing mold heights commonly processed in tire curing presses of any size.

In general, hydraulically actuated press designs to the present time which have solved the above problems have resulted in a press of size, weight and complexity comparable to conventional mechanical presses with the recognized disadvantage of a hydraulically operated device in a rubber processing facility.

DISCLOSURE OF THE INVENTION

Therefore, an object of the present invention is to provide a tire curing press which satisfies industry requirements for tire curing press performance and cost. Another object of the invention is to provide a tire curing press in which even stringent mold support deflection limitations may be technically and economically achieved to realize substantially uniform mold loading. A further object of the invention is to provide a tire curing press which may be provided with a single cavity that inherently provides an extent of cure flexibility and an ability for handling limited production items where only a single mold is employed.

Another object of the present invention is to provide a unique press configuration employing generally triangular upper and lower beam members which are interconnected for controlled relative movement by three posts or rods proximate the corners of the triangular beam members. Yet another object of the invention is to provide such a triangular beam press wherein the squeeze force is applied to the molds through upper and lower platens and bolsters by squeeze actuation apparatus positioned on the beams and operating on the bolsters. Still another object of the invention is to provide such mold squeeze loading in a manner in which platen surface deflection can exceed the most stringent current specifications by the selective location of force application points between the beams and the bolsters to achieve desired load characteristics with varying sizes of tires. Still another object of the present invention is to provide an application of force by a lower triangular beam in a selected annular configuration on a lower bolster and an application of force by an upper triangular beam on an upper bolster at a number of points or discrete areas of selective size and spacing, both at a preselected radius on the bolsters.

Another object of the present invention is to provide a press having generally triangular beams employing three strain rods or posts to effect substantial reductions in press size, weight and volume characteristics. Yet another object of the present invention is to provide a press having three connecting rods or posts which control vertical motion of the press cross beam and permit rapid and accurate mold section opening and closing. A further object of the present invention is to provide a press in which insulation elements may be employed to effect substantial reduction in heat loss of the press and related piping.

A still further object of the present invention is to provide a press which is hydraulically actuated with opening and closing movement of the cross beam being effected by a hydraulic lift assembly and the mold squeeze being applied by separate hydraulic elements. Another object of the present invention is to provide a press which is hydraulically operated to permit usage of a high water base fluid which minimizes deleterious action with respect to pneumatic tires and other press components in the event of inadvertent escape of even limited amounts of hydraulic fluid in conjunction with the operation and maintenance of a press.

Still another object of the present invention is to provide a strain rod locking assembly which effects positive locking of the strain rods or posts relative to the beams irrespective of possible failure of hydraulic pressure supply to the press during the curing operation. Still a further object of the invention is to provide a press having a strain rod locking assembly which is capable of lockingly engaging a strain rod at various positions along the length thereof to effect locking in the closed and open position. Another object of the present invention is to provide a strain rod locking assembly wherein the strain rod may be engaged over a range of positions constituting the mold closed position when employing molds having varying height characteristics, thereby eliminating the necessity for the cost and complexity of separate mold height adjustment apparatus. Yet another object of the present invention is to provide a strain rod locking assembly wherein interengaging threads of a split nut and a strain rod are without radial loading components during loading accompanying mold squeeze. Another object of the present invention is to provide a strain rod locking assembly which has a separate subsidiary safety mechanism which mechanically precludes release by the mold locking assembly irrespective of the operability of the hydraulic system or other components.

In general, a single cavity tire curing press according to the concepts of the present invention includes a fixed base, a base beam mounted on the fixed base, a lower mold section for a tire supported by the base beam, a cross beam supportingly mounting an upper mold section, a beam lifting device for effecting relative movement between the base beam and the cross beam, a connecting rod assembly for aligning the upper mold section and the lower mold section, bolster assemblies interposed between the beams and the mold sections, and loading elements interconnecting the beams and the bolsters for applying mold section squeeze forces at selected locations on the bolsters producing substantially uniform loading on the mold sections. The tire curing press may have in lieu of or in addition to the loading elements strain rod locking assemblies selectively locking the strain rod of each connecting rod assembly during the application of squeeze forces to the mold sections.

PREFERRED EMBODIMENT FOR CARRYING OUT THE INVENTION

Figure 1:
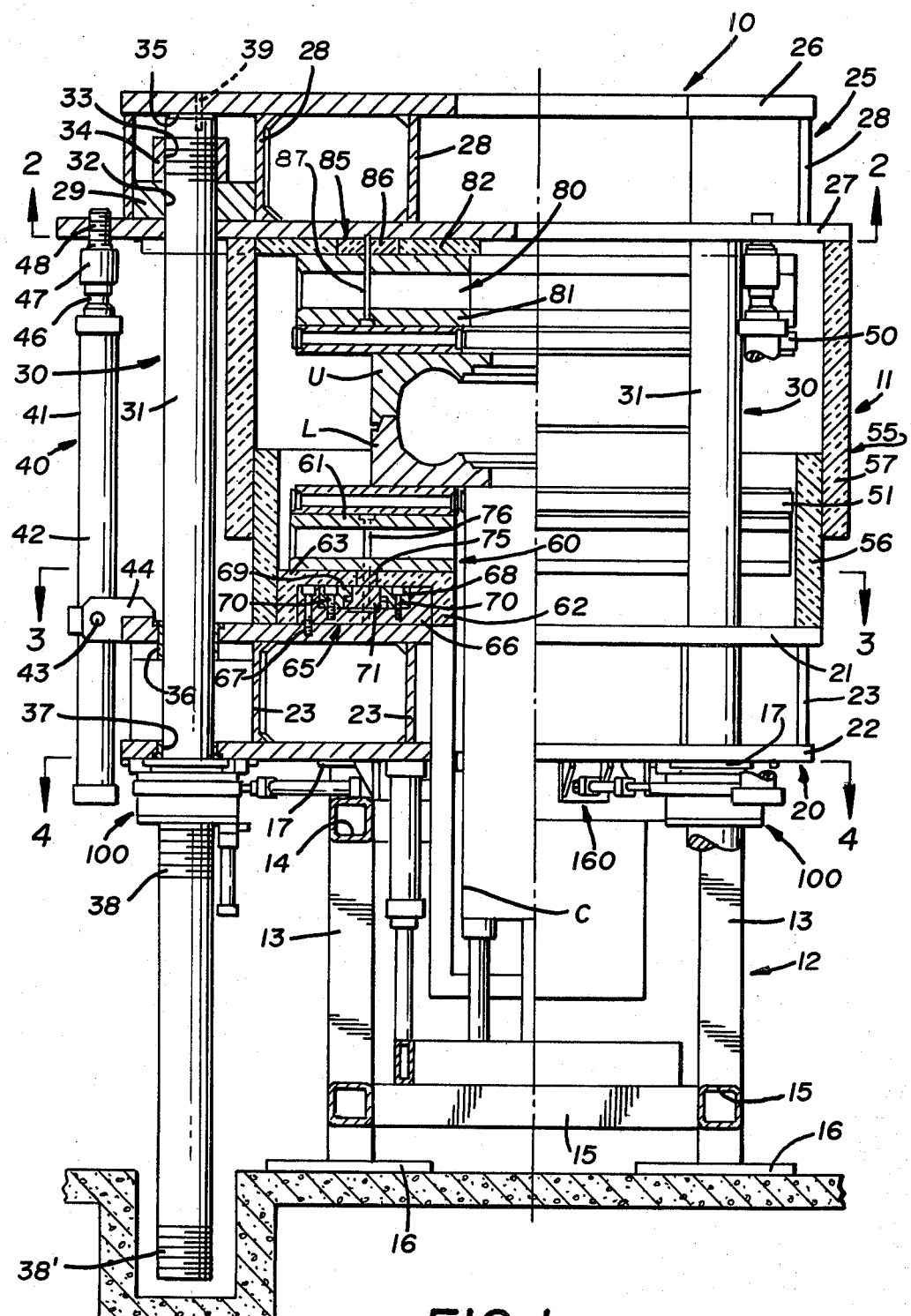
FIG. 1 is an elevational view with a portion in section of a tire curing press according to the concepts of the present invention presented as an enlarged view taken substantially along the line 1—1 of FIG. 2.

In the form of the invention illustrated herein, a single cavity tire curing press, generally indicated by the numeral 10, is depicted in overall layout in FIG. 1 of the drawings. As shown, the press 10 is adapted for positioning on a floor or alternatively in a pit prepared for purposes of accommodating a portion of the lower extremity thereof. As shown, the press 10 has a framework, generally indicated by the numeral 11, which includes a base assembly, generally indicated by the numeral 12. The base assembly 12 may conveniently be constructed of a plurality of tubular members forming a generally rectangular configuration consisting of four corner struts 13 interconnected by upper and lower cross braces 14 and 15, respectively, extending from each of the corner struts 13 to the rectangularly adjacent corner struts 13. The corner struts 13 may be provided with floor engaging pads 16 which are preferably of greater cross-sectional area than the corner struts 13 for purposes of effecting stable seating on the floor of a tire manufacturing facility or a pit constructed therein. The upper extremities of the corner struts 13 opposite the floor engaging pads 16 are provided with mounting pads 17 which seat a base beam assembly, generally indicated by the numeral 20.

Figure 2:
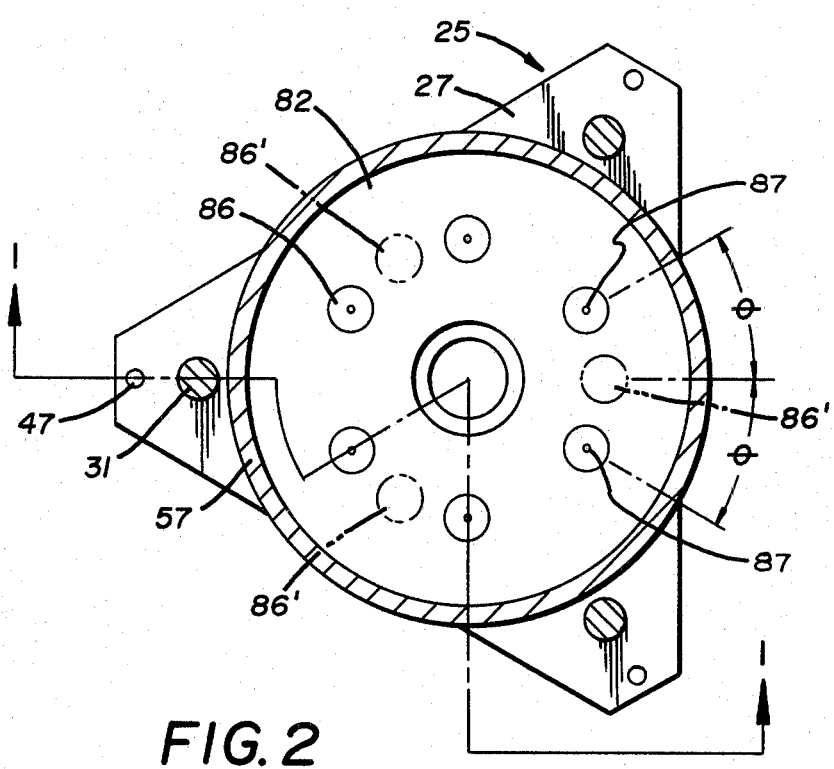
FIG. 2 is a reduced sectional view of the tire curing press of FIG. 1 taken substantially along the line 2—2 of FIG. 1 and showing particularly the cross beam, upper bolster area and the supporting elements thereof.
Figure 3:
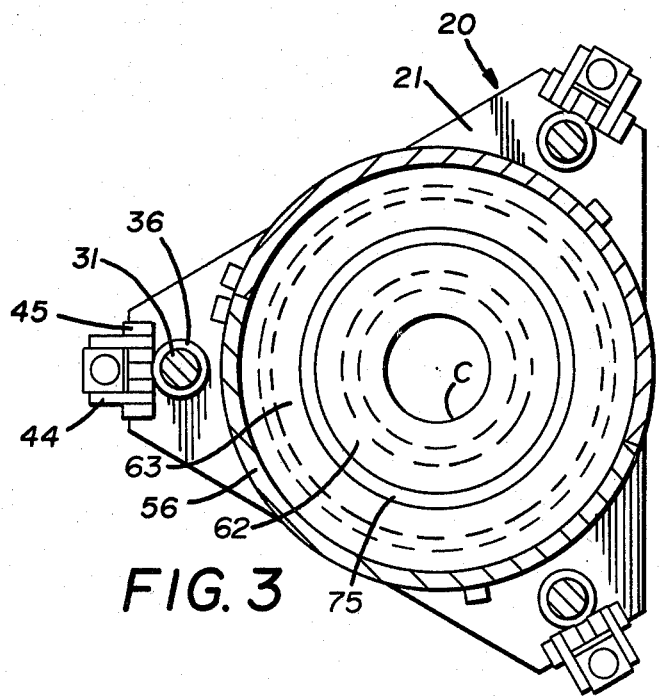
FIG. 3 is a reduced sectional view similar to FIG. 2 taken substantially along the line 3—3 of FIG. 1 and depicting particularly the lower bolster area and the elements thereof as well as the cylinder mounting of the cross beam lift assembly.
Figure 4:
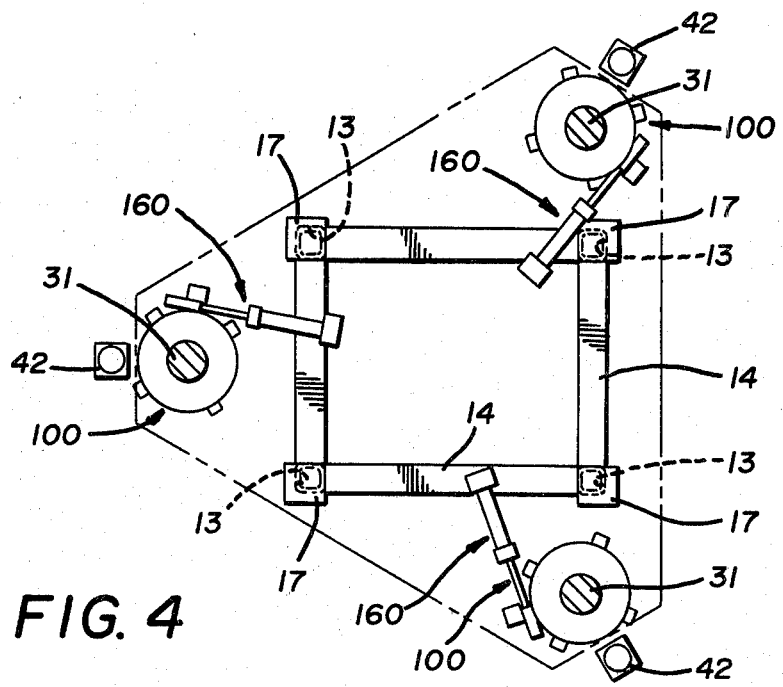
FIG. 4 is a reduced sectional view similar to FIGS. 2 and 3 taken substantially along the line 4—4 of FIG. 1 and depicting the location and orientation of strain rod lock assemblies in relation to the strain rods.

The base beam assembly 20 is of a generally triangular configuration as viewed from the top, as seen in FIGS. 3 and 4, inclusive, and is composed of an upper base beam plate 21 and a lower base beam plate 22 which are spaced and joined by a plurality of vertical web members 23 which with the plates 21, 22 provide a base beam assembly having substantial structural rigidity. The base beam assembly 20 together with the base assembly 12 constitute the principal lower members of the press framework 11. The principal upper member of the press framework 11 is a cross beam assembly, generally indicated by the numeral 25, which is preferably similar to the base beam assembly 20 in a number of particulars. As seen in FIGS. 1 and 2, the cross beam assembly 25 consists of a pair of triangular plates, an upper cross beam plate 26 and a lower cross beam plate 27, which are spaced and joined by a plurality of vertical rib members 28 which function to impart comparable structural rigidity to the cross beam assembly 25 as exists with respect to the base beam assembly 20. The overall triangular configuration of base beam 20 and cross beam 25 is preferably substantially an equilateral triangle.

The framework 11 includes for purposes of movably mounting the cross beam assembly 25 relative to the base beam assembly 20, connecting rod assemblies, generally indicated by the numeral 30. As shown, there are three connecting rod assemblies 30, one located proximate each of the angles or corners of the triangularly configured beam assemblies 20, 25. As seen particularly in FIG. 1, each of the connecting rod assemblies 30 includes an elongate strain rod 31 which interconnects the cross beam assembly 25 and the base beam assembly 20 during the full extent of movement of the cross beam assembly 25. As shown, the strain rods 31 are, in a manner hereinafter described, fixedly attached to the cross beam assembly 25 and movably attached to the base beam assembly 20. It is to be appreciated, however, that the fixed and movable attachments could be reversed or other arrangements would be possible while still carrying out the objects and operation of the invention contemplated herein.

As best seen in FIG. 1, the corners of the cross beam assembly 25 and particularly the lower cross beam plate 27 are provided with reinforcing plates 29 which may be welded or otherwise attached thereto. The cross beam plates 27 and overlying reinforcing plates 29 have bores 32 through which a portion of the strain rods 31 extend. The strain rods 31 have in the area beyond reinforcing plates 29 a threaded extent 33 which receives a retaining nut 34 having matingly engaging threads. As shown, the strain rods 31 extend beyond the threaded extent 33 to an axial extremity 35 which is positioned proximate to upper cross beam plate 26 for a purpose hereinafter described.

In contrast to the fixed attachment of strain rods 31 to cross beam plate 27, the rods 31 are axially movably received and guided by the base beam assembly 20 which is fixed to the base assembly 12. Specifically, the base beam assembly 20 carries vertically spaced bearing members such as an upper strain rod bushing 36 mounted in upper base beam plate 21 and a vertically aligned lower strain rod bushing 37 mounted in lower base beam plate 22. It will therefore be appreciated that the cross beam assembly 25 may be moved vertically from the closed position depicted in FIG. 1 of the drawings, with the three strain rods 31 in engaging their respective bushings 36, 37 being maintained in a vertical orientation such that the cross beam assembly 25 is at all times maintained in a horizontal alignment parallel to the base beam assembly 20, as is the case with vertical motion presses.

The movement of the cross beam assembly 25 as referenced above is selectively effected by a cross beam lift assembly, generally indicated by the numeral 40, associated with and preferably positioned proximate to each of the connecting rod assemblies 30. As shown, each cross beam lift assembly 40 consists of an elongate cylinder 41 having a cylinder casing 42 which is attached as by a pin 43 with each of two brackets 44 and 45 positioned to either side of the cylinder casing 42 to form a clevis configuration (FIG. 3). The cylinder brackets 44 and 45 are rigidly attached to the base beam assembly 20 and conveniently the upper base beam plate 21. The cylinder 41 has a rod 46 which extends outwardly of the casing 42 and as shown is affixed to a rod end coupler 47 which has an extremity 48 which is affixed to the cross beam assembly 25 and particularly the lower cross beam plate 27 at a position proximate reinforcing plates 29. It will thus be appreciated that selective actuation of the cylinder 41 will effect linear extension of the rod 46 from the closed position depicted in FIG. 1 of the drawings, dictated by closure of the mold sections being employed, to a fully open position represented by the full extension of cylinder rod 46 relative to the fixed cylinder casing 42.

The press framework, generally indicated by the numeral 11, including primarily the base beam assembly 20, the cross beam assembly 25 and the connecting rod assemblies 30 operate to resist the forces and moments which are imparted under maximum loading conditions for a particular press. The opening and closing of the press is effected by the cross beam lift assembly 40 discussed hereinabove. The locking mechanism for maintaining the press in the closed position under full load and subsidiarily maintaining the press open is described hereinafter in detail. In view of recognized difficulties in limiting the deflection of beams such as base beam assembly 20 and cross beam assembly 25 to values within a desired range to maintain mold closure characteristics without imparting additional size, weight and related excessive cost characteristics the instant press employs unique structural interrelationships between the beam assemblies 20, 25 and an exemplary upper mold section U and lower mold section L.

As shown, the mold section U and L may have any of the numerous characteristics of conventional molds which are and have been employed in the industry including segmented molds of varying types, the actuating cylinders for which could be readily affixed to the press 10, as will be appreciated by persons skilled in the art. In conventional fashion, the upper mold section U is attached to an carried by an upper platen 50 in a manner well known to persons skilled in the art. Similarly, the lower mold section L is seated upon and attached to a lower platen 51, the platens providing a heat transfer surface for seating the mold sections U, L and being internally aperatured for the circulation of curing fluid therethrough for the ready transfer of heat to the adjacent upper and lower mold sections U, L. The upper and lower mold sections U, L are protected from heat loss radially outwardly thereof by a heat shield, generally indicated by the numeral 55. While the heat shield 55 could take various forms, significant convenience results from a configuration consisting of a lower annular shield 56 attached to and projecting from the base beam assembly 20 and an upper annular shield 57 attached to and projecting from the cross beam assembly 25. As shown, the shields 56, 57 are made of any of a variety of known rigid insulating materials and are concentrically arranged but of differing diameters to overlap an extent in mating sealing frictional engagement due to the outer surface of the shield 56 being of substantially the same diameter as the inner surface of shield 57.

Interposed between the platens 50, 51 and the beams 25, 20 are a lower bolster assembly, generally indicated by the numeral 60, and an upper bolster assembly, generally indicated by the numeral 80. The bolster assemblies 60, 80 accomplish the function of thermally isolating the platens axially thereof within the heat shield 55, provide a conventional mounting for the platens 50, 51 and effect an interconnection between the beams 20, 25 and the platens 50, 51 to thereby control the transmission of loading to and deflection of the platens 50, 51 as supports for the mold sections U, L.

The lower bolster assembly 60, as best seen in FIGS. 1 and 3, has what may be a conventional bolster element 61 underlying the platen 51 and conventionally attached thereto in a manner well known to persons skilled in the art. Underlying the bolster 61 is an inner insulation blanket 62 and an outer insulation blanket 63 which may be essentially annular fiberglass elements extending from a position proximate the center mechanism area C of the press to the inner wall of the lower annular heat shield 56.

The lower bolster 61 is interconnected to the base beam assembly 20 and particularly the upper base beam plate 21 by a squeeze cylinder assembly, generally indicated by the numeral 65. The squeeze cylinder assembly 65 consists of an annular base 66 of generally U-shaped configuration which is attached to the upper base beam plate 21 as by bolts 67. Positioned within the base 66 are an inner retaining ring 68 and an outer retaining ring 69 which are attached to the base 66 as by cap screws 70 or other fasteners to form a casing for the cylinder assembly 65. A T-shaped piston 71 having an annular upper surface is maintained within the retaining rings 68 and 69 and is selectively movable upwardly as a diaphragm cylinder a minimal distance upon the introduction of fluid pressure between the base 66 and the piston 71 to effect the requisite squeeze loading upon the mold sections U, L.

The force effected by squeeze cylinder assembly 65 upon movement of the piston 71 is transmitted to the bolster 61 by a loading ring 75 which is axially interposed between the bolster 61 and the piston 71. The loading ring 75 is also radially interposed between the inner insulation blanket 62 and the outer insulation blanket 63. The loading ring 75 is preferably constructed of a fiberglass reinforced thermoset polyester or other material which while possessing high insulating qualities is capable of transmitting extremely high compression loads without deleterious effects. The bolster 61, the loading ring 75, the piston 71 and base 66 are interconnected in an assembly sense as by a shoulder screw or other fastener 76. The size of the loading ring 75 and the positioning thereof radially of the lower bolster 61 is dependent upon a plurality of factors described hereinafter.

The upper bolster assembly 80, as best seen in FIGS. 1 and 2, has in a manner similar to lower bolster assembly 60 in a conventional bolster element 81 engaging the platen 50 and conventionally attached thereto as is well known to persons skilled in the art. Adjacent the bolster 81 is an insulation blanket 82 which in a manner comparable to insulation blankets 62 and 63, axially thermally isolates the bolster 81 from the cross beam 25 and particularly the lower cross beam plate 27.

The squeeze force applied by the cylinder assembly 65 when the press is closed is transmitted between bolster 81 and cross beam assembly 25 by a plurality of loading pads, generally indicated by the numeral 85. As shown, the loading pads 85 are cylindrical pads 86 which may be made of reinforced polyester or other material having characteristics as described in conjunction with the loading ring 75. The cylindrical pads 86 have the centers thereof positioned on a circle concentric with the upper mold section U, platen 50 and other elements associated with the cross beam assembly 25. As shown, there are six circularly positioned cylindrical pads 86. The bolster 81 and cylindrical pads 86 are assembled to lower cross beam plate 27 as by a shoulder screw or other fastener 87. It is to be appreciated that shoulder screws or other fasteners 76 and 87 preferably retain the assembled elements without clamping engagement. As a result, the shoulder screws 76 and 87 may be positioned in radial slots in the bolster 61 and 81 which permit their radial expansion and contraction of the bolsters during heating and cooling without the possibility of introducing misalignment.

The selection of the position, extent and characteristics of the loading ring 75 and the loading pads 85 are such as to effect loading on the bolsters 61, 81 and the respective platens 51, 50 at locations having essentially equal deflection under the beam loading characteristics of the base beam assembly 20, cross beam assembly 25 and strain rod assemblies 30 for a particular press sized and loaded for desired operating parameters. In order to balance the loading with respect to the upper and lower platens 50, 51, the radius of the center of the cylindrical pads 86 and the radial center of the loading ring 75 are preferably substantially equal. This radius may be selected by calculation to maintain loading with the loading ring 75 and loading pads 85 selected within a minimum desired value for the entire range of tire mold sections U, L which may be employed for a particular press 10. In most instances, the optimum radius for the largest mold which the press is designed to accommodate will dictate the subject radius.

The loading ring 75 employed in conjunction with the lower mold section L provides an optimum theoretical solution of a minimum substantially uniform deflection although involving substantial cost factors. The usage of six cylindrical pads 86 provides good deflection characteristics at reduced expense. The cylindrical pads 86 seen in FIG. 2 are located relative to a line from a strain rod 31 through and beyond the center of the press 10, displaced to either side of the line relative to the center through an angle $\iota$ of 30°, and disposed at the radius selected as described hereinabove relative to the center line of the press. It is to appreciated that squeeze loading could be effected by employing individual cylinders at the position of each of the cylindrical pads 86 except for the expense which could well exceed that of the diaphragm or squeeze cylinder assembly 65.

Another possible loading configuration could involve the positioning of three cylindrical loading pads 86 on a radius selected as hereinabove described at positions thereon at the intersection of a line through the strain rod 31 and beyond the press center line. Such an arrangement of cylindrical pads is depicted in FIG. 2 in chain lines and designated by the numerals 86'. While a lesser number of pad elements would be employed, substantially greater deflection would be transmitted than in employing six cylindrical pads 86 or a loading ring 75 such that to achieve equivalent minimum deflection values greater strength and rigidity would be required in the design of the base beam assembly 20 or cross beam assembly 25 and related components. It will be appreciated by persons skilled in the art that the size and positioning of the load transmitting areas or locations will require a balancing of performance and cost considerations for particular parameters to be achieved.

The fixed positioning of the cross beam assembly 25 relative to the base beam assembly 20 for application of force by the squeeze cylinder assembly 65 and the maintenance of the cross beam assembly 25 in the press open position is effected by strain rod lock assemblies, generally indicated by the numeral 100. As best seen in FIGS. 1 and 4, a strain rod lock assembly 100 is employed in conjunction with each of the three connecting rod assemblies 30 and located proximate the corners of the beam assemblies 20, 25. As shown, a preferred position for the strain rod lock assemblies 100 is below the base beam assembly 20 and preferably attached to the underside of the lower base beam plate 22. Since the strain rod lock assemblies 100 employed in conjunction with the strain rod 31 of each connecting rod assembly 30 may be and are preferably identical, the following description is applicable to all three assemblies.

Figure 5:
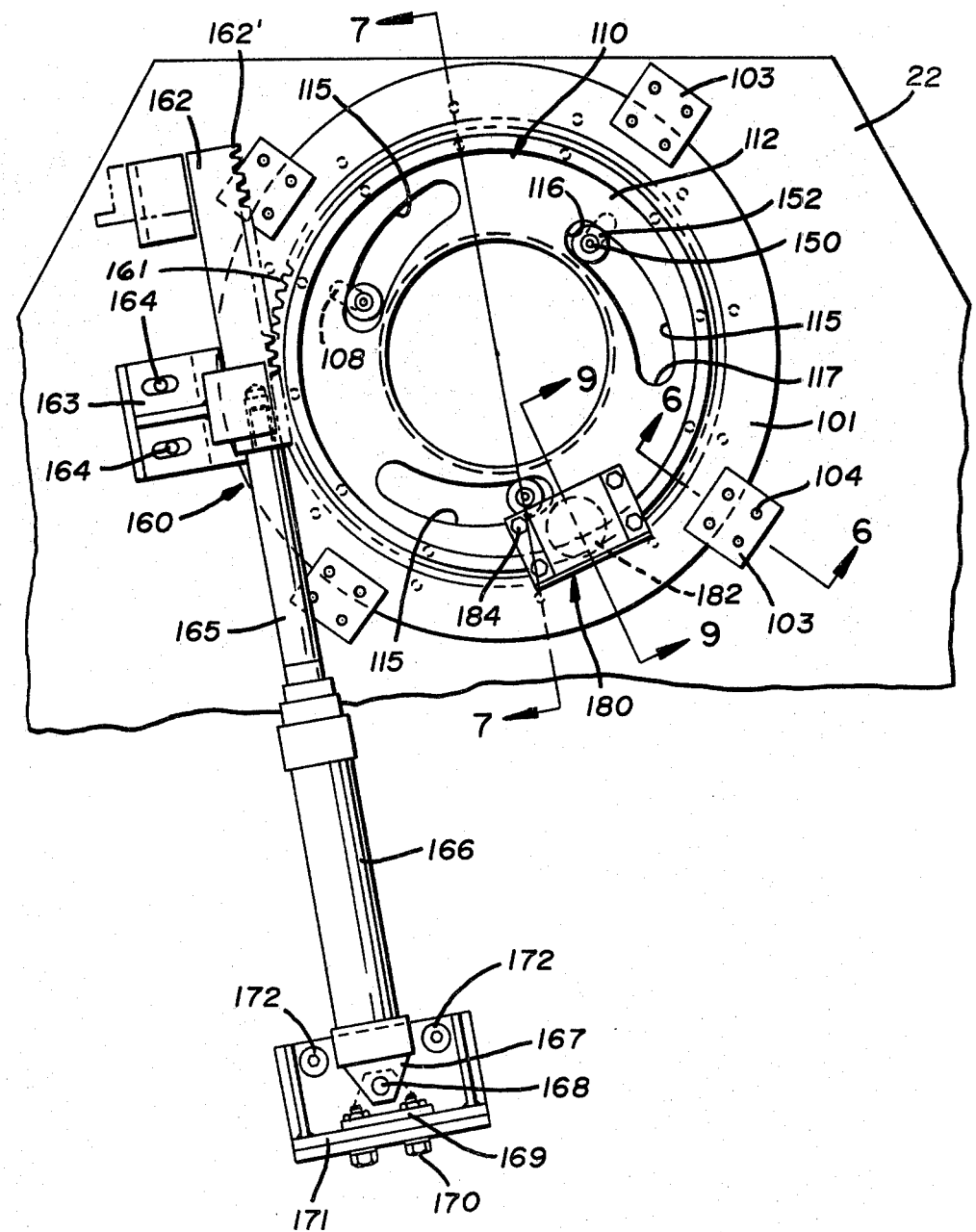
FIG. 5 is a bottom plan view of a fragmentary portion of the base beam showing the location and details of a strain rod lock assembly.
Figure 6:
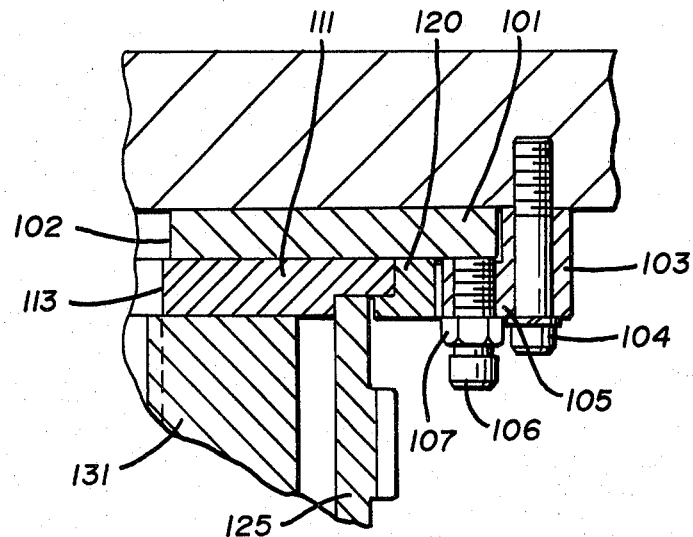
FIG. 6 is an enlarged fragmentary sectional view taken substantially along the line 6—6 of FIG. 5 depicting the clamp assembly affixing the strain rod lock assembly to the base beam assembly.
Figure 7:
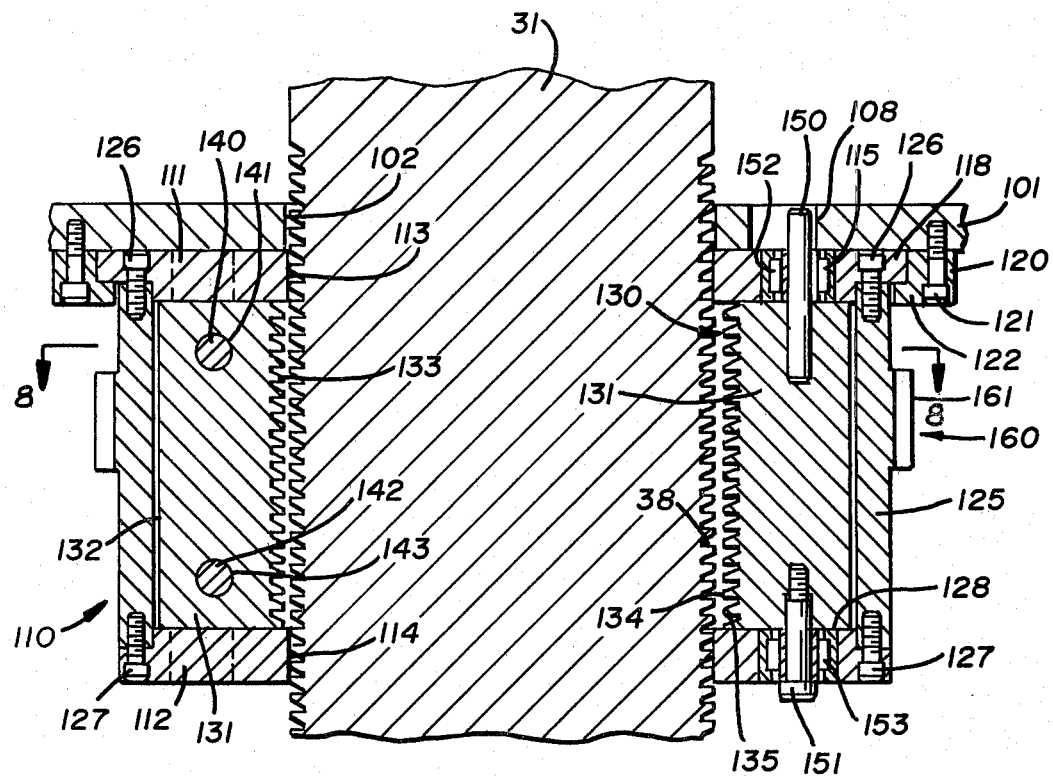
FIG. 7 is a sectional view of the strain rod lock assembly taken substantially along the line 7—7 of FIG. 5 and showing particularly the cam and split nut assemblies in their expanded position in relation to a strain rod.

The strain rod lock assembly 100 has a support plate 101 which engages the underside of lower base beam plate 22 of the base beam assembly 20 and has a central aperture 102 having a diameter in excess of the diameter of the strain rod 31 of the connecting rod assembly 30 (FIGS. 5 and 7). The support plate 101 is selectively positioned for adjustable rotation on the lower base beam plate 22 by a plurality of clamps 103 depicted in FIGS. 5 and 6. The clamps 103 are attached to lower base beam plate 22 as by a plurality of cap screws or other fasteners 104 which extend through the clamps 103. The support plate 101 may conveniently be of a generally circular outer configuration with four clamps 103 positioned at substantially 90° intervals about the periphery thereof. As shown, the clamps 103 have a radially inwardly directed flange 105 which overlies the support plate 101. A plurality of cap screws 106 secure the support plate 101 rotationally relative to the clamps 103. Once the cap screws 106 have been adjusted with the support plate 101 in a preselected position relative to clamps 103 a locking nut 107 on the cap screw 106 may be secured against the clamps 103 to assure retentive positioning of the cap screws 106.

As best seen in FIGS. 5-7, the support plate 101 carries a dual cam assembly, generally indicated by the numeral 110. The dual cam assembly 110 has an upper cam plate 111 and a lower cam plate 112 which are of generally circular configuration and which have internal bores 113 and 114, respectively, which in a manner similar to the support plate 101 are of greater diameter than the diameter of the strain rod 31. Each of the cam plates have three cam tracks or slots 115 (see FIG. 5) which are preferably spaced equally about the cam plates 111, 112, i.e., with corresponding parts at approximately 120° increments and with the cam tracks 115 being angularly oriented such that differing portions thereof lie at different radial distances with respect to the cam plates 111, 112. Thus, the cam tracks 115 have an extremity 116 of least radial distance and an extremity 117 of greatest radial distance relative to the center of the cam plates 111, 112. The cam plates 111, 112 preferably have corresponding portions of cam slots 115 vertically aligned. The upper cam plate 111 has a radially outward projection 118, which is employed for its rotatable retention relative to the base plate 101 and clamp 103 by a retaining ring 120. The retaining ring 120 is attached as by cap screws 121 to the support plate 101 and has a radially inwardly extending flange 122 adapted to overlie the radial projection 118 of the upper cam plate 111.

Figure 8:
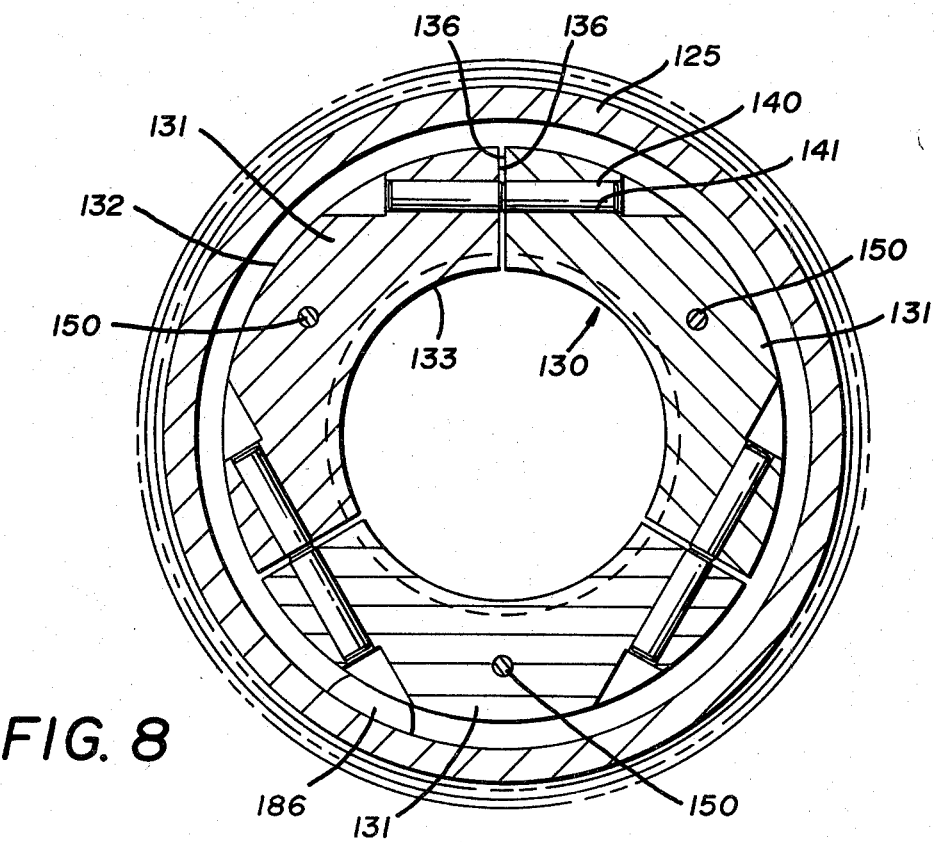
FIG. 8 is a sectional view of the strain rod lock assembly taken substantially along the line 8—8 of FIG. 7 with the split nut segments in their collapsed position and showing the interconnection between sections.

The dual cam assembly 110 has the upper cam plate 111 and the lower cam plate 112 separated and joined by a cam spacer 125 which is seen in FIGS. 6, 7 and 8. As best seen in FIG. 7, the cam spacer 125 is of generally cylindrical configuration and is attached preferably proximate the periphery of the upper cam plate 111 by cap screws 126 and proximate the periphery of the lower cam plate 112 by cap screws 127. Thus, the cam spacer 125 when coupled with the cam plates 111, 112 form what is in effect a type of cylindrical housing 128.

The cylindrical housing 128 encompasses a split nut assembly, generally indicated by the numeral 130. As shown, the split nut assembly 130 consists of three identical nut segments 131 which in the contracted position depicted in FIG. 8 of the drawings constitute in effect a circular nut having a cylindrical outside surface 132 and a cylindrical inside surface 133 having threads 134 extending the full axial extent of the nut segments 131. As shown, the threads 134 are of the buttress type in that a tooth surfce 135 thereof is directed radially thereof for a purpose to be described hereinafter.

As best seen in FIGS. 7 and 8, each of the nut segments 131 terminates circumferentially thereof in radial surfaces 136 which abut comparable surfaces of the circumferentially adjacent nut segments 131. The segments 131 are joined at the radial surfaces 136 by upper connecting pins 140 which repose in bores 141 and lower connecting pins 142 which repose in bores 143. It will thus be appreciated that the radially outward movement of nut segments 131 from the contracted position depicted in FIG. 8 to the expanded position depicted in FIG. 7 will effect a spacing of the radial surface 136 of adjacent nut segments 131 from the proximate abutting position of FIG. 8 to a spaced position as guided by the connecting pins 140, 142. The positioning of the split nut assembly 130 relative to the dual cam assembly 110 is effected as hereinafter described to achieve the controlled contraction and expansion of the nug segments 131.

Each of the nut segments 131 mount proximate their axial extremities an upper cam follower shaft 150 and a lower cam follower shaft 151. As seen in FIGS. 5 and 7, the cam follower shafts 150, 151 carry roller mounted cam followers 152 and 153, respectively, which are adapted to move in each of the three arcuate cam tracks 115 in each of the cam plates 111, 112. The radial direction and extent of movement of segments 131 is effected by radial slots 108 in the support plate 101 configured to receive cam follower shafts 150. It thus is to be appreciated that the radial inward and outward movement of the nut segments 131 is controlled at each axial extremity of the segments by cam shaft and followers there positioned in cooperation with slots 108 at one extremity. Thus rotation of the dual cam assembly 110 will effect movement of cam followers 152, 153 in the cam tracks 115 such as to produce the radial expansion and contraction dictated by the extent and inclination of the cam tracks 115 and slots 108.

The requisite rotation of the dual cam assembly 110 to effect the radial movements of the split nut assembly 130 is accomplished by a cam drive mechanism, generally indicated by the numeral 160. The cam drive mechanism 160 has a pinion gear 161 extending at least a portion of and, as shown, about the entire periphery of cam spacer 125 of dual cam assembly 110. The pinion 161 of cam drive mechanism 160 is matingly engaged and operatively moved by a rack 162 having teeth 162'. The rack 162 is positioned by a conventional rack guide 163 which is affixed to the lower base beam plate 22 of the base beam assembly 20 as by cap screws 164 or other fasteners. The rack 162 as mounted on rack support 163 is attached to a cylinder rod 165 extensible from a conventional cylinder 166 for selective actuation to effect longitudinal movement of the rack 162 and bring a selected portion of the teeth 162' thereof into engagement with pinion 161. The cylinder 166 may have a clevis mount 167 which is connected by a pin 168 to a mounting bracket 169 which is attached by bolts or other fasteners 170 to an angle mounting plate 171 which is attached to the lower base beam plate 22 of base beam assembly 20 as by cap screws or other fasteners 172.

The actuation of split nut assembly 130 by the cam drive mechanism 160 effects a locking of each of the strains rods 31 of the connecting rod assemblies 30 by virtue of the intermeshing engagement of the contracted nut segments 131 and particularly the intermeshing of the threads 134 with mating buttress threads 38 on the strain rod 31 as best seen in FIGS. 1 and 7. The threads 38 on strain rod 31 extend a sufficient distance relative to the depicted closed position seen in FIG. 1 such that locking engagement of the strain rods 31 can be effected for any mold height which might be employed in a press having the particular design operating characteristics. The threads 38 are discontinuous along strain rod 31 with a further extent of thread 38' of the same pitch being provided proximate the extremity of strain rod 31 opposite the retaining nut 34. The threads 38' thus provide a second area for locking engagement of the strain rod 31 by the strain rod lock assembly 100 when the press 10 is in the open position as effected by the cross beam lift assembly 40.

It is to be appreciated that the buttress threads 38, 38' have the radial portions 135 oriented as seen in FIG. 7 such that they constitute the loading surfaces when the strain rod 31 endeavors to move upwardly as viewed in FIG. 7 under press loading conditions. With the radial portions 135 of the threads 134 thus oriented there is a total absence of lateral loading forces on the nut segments 131 with the press under load such that possible tendencies for the nut segments 131 to open under vibration or other operating anomalies are eliminated with the instant design. It will be appreciated that the aforedescribed rotational positioning of the strain rod lock assembly 100 components permits adjustment to effect full intermeshing alignment between threads 38 of strain rod 31 and threads 134 of nut segments 131. It will also be appreciated that in order to obviate the possibility of inadvertent rotation of the strain rod 31 once alignment is effected an off-center pin 39 may be inserted through the top cross beam plate 26 of cross beam assembly 25 into the axial extremity 35 of each of strain rods 31.

Figure 9:
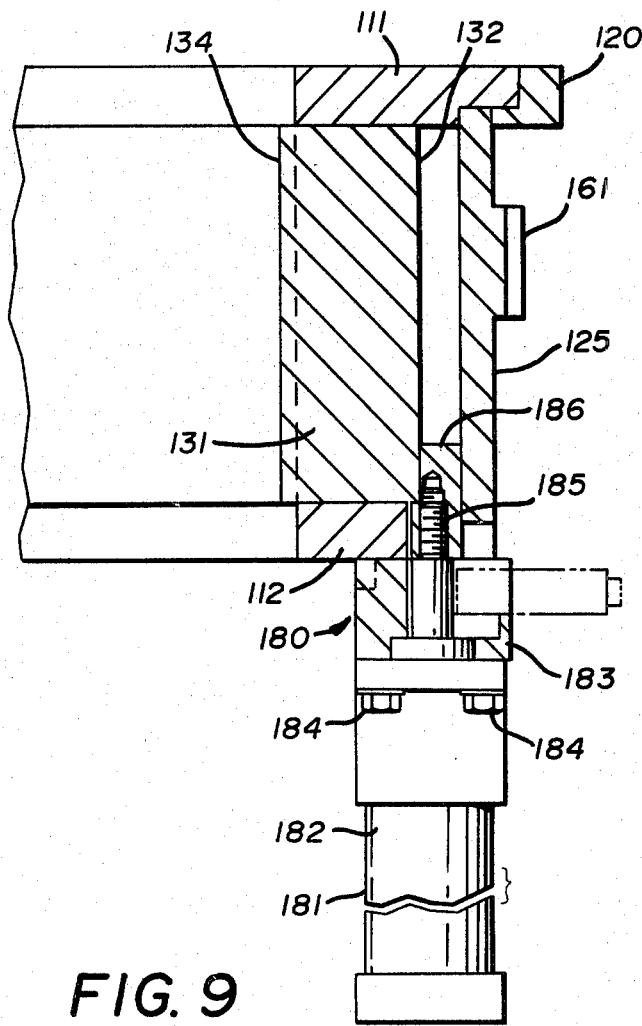
FIG. 9 is a view of the strain rod lock assembly taken substantially along the line 9—9 of FIG. 5 and depicting particularly the safety lock mechanism in the locked position.

While it is to be appreciated that the buttress thread configuration of split nut assemblies 130 and strain rods 31 effectively preclude inadvertent release of the strain rods 31 by the split nut segments, the importance in a safety sense of insuring against untimely release of the cross beam assembly 25 makes the incorporation of a back-up safety lock highly desirable, such a back-up safety lock is particularly useful during the performance of press maintenance but could be employed otherwise as during the normal operating cycle when the press is in the open position or closed during the cure cycle. In this respect each strain rod lock assembly 100 is provided with a safety lock, generally indicated by the numeral 180. The safety lock assembly 180 consists essentially of a cylinder 181 having its casing 182 attached to a cylinder mounting pad 183 which is affixed as by cap screws 184 to the dual cam assembly 110 and particularly the lower cam plate 112. The cylinder 181 has a cylinder rod 185 which has a short stroke and which mounts a stop pin 186 thereon. The stop pin 186 is designed to selectively project between the cylindrical outside surface 132 of split nut segments 131 and the inner cylindrical surface of cam spacer 125 when the split nut segments 131 are in the contracted position depicted in FIGS. 8 and 9 of the drawings. The stop pin 186 therefore operates as a wedge which precludes the adjacent split nut segment 131 from moving radially outwardly and due to the interrelation with the other split nut segments via connecting pins 140, 142 thereby precludes all of the split nut segments 131 from radial expansion. There is thus a positive mechanical lock precluding the release by the strain rod threads 134 of threads 38 or 38' of strain rod 31. The expansion of the split nut segments 131 to the expanded position of FIG. 7 can be effected only upon actuation of the cylinder 181 to withdraw the stop pin 186 from between the split nut segments 131 and the cam spacer 125. It thus will be appreciated that the safety lock 180 constitutes a separate mechanical safety lock in addition to the mechanical configuration of the buttress threads of the split nut assemblies 130 and strain rods 31 operating as a back-up for the hydraulically actuated strain rod assembly 100.

Thus it should be evident that the single cavity tire curing press disclosed herein carries out the various objects of the invention set forth hereinabove and otherwise constitutes an advantgeous contribution to the art. As may be apparent to persons skilled in the art, modifications can be made to the preferred embodiment disclosed herein without departing from the spirit of the invention, the scope of the invention being limited solely by the scope of the attached claims.

I claim:

1. A tire curing press for manipulating mating mold sections comprising, base means, base beam means mounted on said base means and supporting one mold section for a tire thereon, cross beam means supportingly mounting the other mold section, means attached to and effecting relative movement between said base beam means and said cross beam means, connecting rod means for aligning and interconnecting said base beam means and said cross beam means, bolster means positioned between each said beam means and the respective mold section, and means interposed between each said beam means and the respective bolster means for applying mold section sequeeze forces at locations on each of said bolster means producing substantially uniform loading on the mold sections.

2. A press according to claim 1 wherein said base beam means and said cross beam means are of generally triangular configuration.

3. A press according to claim 2 wherein said connecting rod means include rod means positioned proximate the extremities of said triangular base beam means and said cross beam means.

4. A press according to claim 1 wherein said connecting rod means include rods attached to said cross beam means and extending through said base beam means.

5. A press according to claim 4 wherein said base beam means has spaced bushings receiving said rod means in said base beam means for aligning the base beam means and cross beam means and the mold sections associated therewith.

6. A press according to claim 1 wherein said means interposed between said beam means and said bolster means is located on a circle concentric with the mold sections.

7. A press according to claim 6 wherein said base beam means and said cross beam means are of generally triangular configuration and said connecting rod means are positioned proximate the corners of said triangular beam means.

8. A press according to claim 7 wherein said base beam means and said cross beam means are substantially equilateral triangles having the mold sections mounted concentrically of the center thereof.

9. A press according to claim 8 wherein said means interposed between said base beam means and a lower bolster means has an annular bolster engaging surface.

10. A press according to claim 9 wherein said means interposed between said base beam means and said lower bolster means is a cylinder actuated pad.

11. A press according to claim 10 wherein said means interposed between said cross beam means and an upper bolster means is a plurality of spaced pads.

12. A press according to claim 11 wherein said pads are fabricated of insulating material.

13. A press according to claim 11 wherein said spaced pads are cylindrical.

14. A press according to claim 13 wherein said cylindrical pads are located on a circle concentric with the center of said other mold section and said cross beam means.

15. A press according to claim 1 including a rod lock assembly for selectively locking said connecting rod means relative to said beam means.

16. A press according to claim 15 wherein said rod lock means is affixed to said base beam means and said connecting rod means is rigidly attached to said cross beam means.

17. A press according to claim 1, wherein said locations on said bolsters are areas of substantially uniform deflection under the squeeze forces applied.

18. A press according to claim 1 including means for engaging said connecting rod means which is nut means and said connecting rod means has thread means for engagment by said nut means.

19. A press according to claim 18 wherein said nut means is a split nut having a plurality of segments.

20. A press according to claim 19 wherein said connecting rod means includes strain rods having helical threads adapted for mating engagement by said segments of said split nut.

21. A press according to claim 20 wherein said nut segments are radially expansible and contractible to engage said threads of said strain rods.

22. A press according to claim 21 wherein said dual cam means includes a pair of cam plates spaced and joined by a spacer to form a cylindrical housing.

23. A press according to claim 22, wherein said cam plates have cam slots and said split nut segments carry cam followers engaging said cam slots.

24. A press according to claim 23, wherein said cam followers are mounted on shafts on the axial extremities of said nut segments, some of said split shafts of said cam followers engage radial slots in a fixed support plate.

25. A press according to claim 24, wherein said split nut segments are expanded and contracted by a cam drive mechanism to bring the threaded radially inner portion of said split nut segments into engagement with the threads of said connecting rod means.

26. A press according to claim 25, wherein said cam drive mechanism includes a pinion gear on the periphery of said cam spacer and a rack engages said pinion.

27. A press according to claim 26, wherein said rack is positioned by a rack guide and is attached to a cylinder rod for selective movement of said rack longitudinally thereof.

28. A tire curing press for manipulating mating mold sections comprising, base means, base beam means mounted on said base means and supporting one mold section for a tire thereon, cross beam means supportingly mounting the other mold section means attached to and effecting relative movement between said base beam means and said cross beam means, three triangularly arranged connecting rod means interconnecting and aligning said base beam means and said cross beam means during reactive movement, bolster means positioned between each of said beam means and the respective mold section, and means interposed between said beam means and the respective bolster means and applying mold section squeeze forces at selected locations relative to said connecting rod means said bolsters to control the deflection thereof.

29. A tire curing press according to claim 28 including locking means selectively fixedly positioning said means movably joining said beam means during actuation of said means applying mold section squeeze forces.

30. A tire curing press according to claim 28 wherein said locking means maintains said cross beam means in the press open position.

31. A tire curing press for manipulating mating mold sections comprising, base means, base beam means mounted on said base means and supporting one mold section for a tire thereon, cross beam means supportingly mounting the other mold section, means attached to and effecting relative movement between said base beam means and said cross beam means, connecting rod means for aligning and interconnecting said base beam means and said cross beam means selectively rotatably fixed relative to said beam means and having helical threads therealong, bolster means positioned between each said beam means and the respective mold sections, and split nut means having internal helical threads for engaging said helical threads of said connecting rod means for selectively locking said cross beam means relative to said base beam means, each of said split nut means having a plurality of segments mounted for radial expansion and contraction relative to said connecting rod means and being rotationally positionable relative to said beam means for adjusting intermeshing thread alignment between said helical threads of said connecting rod means and said helical threads of said split nut means.

32. A press according to claim 31 wherein said split nut segments are expanded and contracted by cam means.

33. A press according to claim 32 wherein dual cam means engage said split nut segments at the axial extremities thereof.

34. A press according to claim 31, wherein said segments are interconnected by pins which move in bores in said split nut segments.

35. A press according to claim 34, wherein said segments have surfaces extending radially and axially thereof in which said bores are positioned.

36. A press according to claim 35, wherein each of said surfaces have a pair of spaced bores for maintaining alignment of said split nut segments axially and rotationally of the pins during contraction and expansion of said nut means.

37. A press according to claim 31 wherein said split nut means has three segments.

38. A press according to claim 31, wherein said helical threads are buttress threads positioned to minimize lateral loading forces on said segments with the press under load.

39. A press according to claim 31, including a safety lock assembly providing a positive back-up to said means for engaging said connecting rod means.

40. A press according to claim 39, wherein said split nut segments are movable within a housing and said safety lock assembly cooperates with said split nut segments and said housing.

41. A press according to claim 40 wherein said safety lock assembly includes a stop pin insertable between said housing and said split nut segments when said split nut segments are in the radially contracted position for locking engagement with said connecting rod means.

42. A press according to claim 41, wherein said stop pin is selectively cylinder actuated for insertion and removal relative to said housing and said split nut segements.

* * * * *

UNITED STATES PATENT AND TRADEMARK OFFICE
CERTIFICATE OF CORRECTION

PATENT NO. : 4,453,902

DATED : June 12, 1984

INVENTOR(S) : Jean-Maurice Imbert

It is certified that error appears in the above-identified patent and that said Letters Patent are hereby corrected as shown below:

Col. 6, l. 26, before "lower" insert --a--.
Col. 6, l. 27, "section" should read --sections--.
Col. 6, l. 34, "an" (1st occurrence) should read --and--.
Col. 6, l. 39, "aperatured" should read --apertured--.
Col. 7, l. 47, after "60" delete "in".
Col. 8, l. 36, "angle 1" should read --angle $\theta$--.
Col. 10, l. 12, "surfce" should read --surface--.

Col. 14, l. 5, after "section" insert --,--.
Col. 14, l 10, "reactive" should read --relative--.
Col. 14. l. 15, after "means" insert --on--.
Col. 14, l. 21, "claim 28" should read --claim 29--.
Col. 14, l. 54, after "said" insert --split nut--.

Signed and Sealed this

Second Day of April 1985

[SEAL]

Attest:

DONALD J. QUIGG

Attesting Officer    Acting Commissioner of Patents and Trademarks